US008199381B2

(12) United States Patent
Sudo et al.

(10) Patent No.: US 8,199,381 B2
(45) Date of Patent: Jun. 12, 2012

(54) PASTING APPARATUS AND IMAGE FORMING APPARATUS

(75) Inventors: Kazuhisa Sudo, Kanagawa (JP); Mikio Ishibashi, Kanagawa (JP); Reki Nakamura, Kanagawa (JP); Megumi Ohtoshi, Kanagawa (JP); Yukiko Iwasaki, Kanagawa (JP); Kazuhiko Yuki, Kanagawa (JP); Nobuyuki Koinuma, Kanagawa (JP); Takashi Sakamaki, Kanagawa (JP); Ryuji Yoshida, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1125 days.

(21) Appl. No.: 12/076,201

(22) Filed: Mar. 14, 2008

(65) Prior Publication Data

US 2008/0225351 A1 Sep. 18, 2008

(30) Foreign Application Priority Data

Mar. 15, 2007 (JP) ................................ 2007-067295

(51) Int. Cl.
*H04N 1/04* (2006.01)

(52) U.S. Cl. .......... 358/487; 358/474; 358/518; 358/1.3

(58) Field of Classification Search .................. 358/487, 358/474, 518, 1.3, 1.4
See application file for complete search history.

(56) References Cited

U.S. PATENT DOCUMENTS

| | | | | |
|---|---|---|---|---|
| 5,139,339 | A * | 8/1992 | Courtney et al. | 356/446 |
| 5,751,443 | A * | 5/1998 | Borton et al. | 356/446 |
| 2007/0046963 | A1 * | 3/2007 | Nagase et al. | 358/1.9 |

FOREIGN PATENT DOCUMENTS

| | | |
|---|---|---|
| JP | 03-050586 | 3/1991 |
| JP | 09-274344 | 10/1997 |
| JP | 10-133515 | 5/1998 |
| JP | 2000-108454 | 4/2000 |
| JP | 2002-341623 | 11/2002 |
| JP | 2003-270991 | 9/2003 |
| JP | 2004-191678 | 7/2004 |
| JP | 2006-301323 | 11/2006 |

* cited by examiner

*Primary Examiner* — Houshang Safaipour
(74) *Attorney, Agent, or Firm* — Harness, Dickey & Pierce, P.L.C.

(57) ABSTRACT

A pasting apparatus includes a pasting member operative to paste a non-transparent medium onto an image-formed surface of a transparent medium; and a conveying member that conveys the non-transparent medium to the pasting member by electrostatic adsorption.

19 Claims, 8 Drawing Sheets

PASTING APPARATUS AND IMAGE FORMING APPARATUS

CROSS-REFERENCE TO RELATED APPLICATIONS

The present application claims priority to and incorporates by reference the entire contents of Japanese priority document 2007-067295 filed in Japan on Mar. 15, 2007.

BACKGROUND OF THE INVENTION

1. Field of the Invention

The present invention relates to a pasting apparatus that pastes a non-transparent medium onto an image-formed surface of a transparent medium.

2. Description of the Related Art

In a typical image forming apparatus, an electrostatic latent image is formed at an image forming unit by irradiation of laser light from an optical writing unit. The electrostatic latent image is then made visible, i.e., converted into a toner image, by using toner. The toner image is then transferred onto a recording medium, such as a paper, from a paper feed apparatus and fixed to the recording medium. There has been a demand to obtain a gloss image of photographic quality. Methods for obtaining a gloss image are disclosed, for example, in Japanese Patent Application Laid-open No. 2002-341623, Japanese Patent Application Laid-open No. 2004-191678, Japanese Patent Application Laid-open No. 2003-270991, and Japanese Patent Application Laid-open No. H3-50586.

For example, in Japanese Patent Application Laid-open No. 2002-341623, a special toner is used to give a gloss finish. Specifically, a transparent toner is used. The transparent toner is applied uniformly over the entire surface of a recording medium on which a toner image has been formed to obtain photographic image quality. The transparent toner is applied before fixing the toner image to the recording medium.

In Japanese Patent Application Laid-open No. 2004-191678, a special recording medium is used to give a gloss finish. Specifically, a recording medium having a thermoplastic resin layer at the front and/or reverse surfaces is used. In this case, a toner image is formed on the recording medium, the toner image is fixed to the recording medium in usual manner, and then pressure and heat are applied to recording medium to give a gloss finish.

In Japanese Patent Application Laid-open No. 2003-270991, a special fixing apparatus is used to give a gloss finish. Specifically, a second fixing unit made of a highly smooth belt is used and it is arranged downstream of a normal (first) fixing unit. After the normal fixing (first fixing) at the first fixing unit, cooling and peeling is carried out after melting the toner again at the second fixing unit. Specifically, a uniform gloss is obtained by utilizing the smoothness of the belt.

In Japanese Patent Application Laid-open No. H3-50586, a straightforward method is disclosed where a transparent film is used as a recording medium. Specifically, a mirror image is formed on a transparent film and the transparent film is stuck to a white paper or a white board such that the image is in between the two. An image of superior gloss and texture can be seen when viewed from the side of a transparent film.

However, with Japanese Patent Application Laid-open No. 2002-341623, there are the problems of a necessity to supply transparent toner uniformly over the entire surface and of images becoming blurred due to the transparent toner. This also requires exclusive development of an apparatus body and substantial development resources are therefore required.

In the technology in Japanese Patent Application Laid-open No. 2004-191678, real objective can be achieved only by implementation together with a special fixing apparatus disclosed in Japanese Patent Application Laid-open No. 2003-270991. Moreover, it has problems with regards to structure, cost, and power consumption, etc.

With the technology of Japanese Patent Application Laid-open No. H3-50586, sticking of the transparent film to a white paper is carried out manually using adhesive etc. Because of the manual operation, there are problems with regard to pasting precision (position shifting) and formation of air bubbles between the transparent film and the white paper. The air bubbles cause diffused reflection and degrade the picture quality.

SUMMARY OF THE INVENTION

It is an object of the present invention to at least partially solve the problems in the conventional technology.

According to an aspect of the present invention, there is provided a pasting apparatus including a pasting member operative to paste a non-transparent medium onto an image-formed surface of a transparent medium; and a conveying member that conveys the non-transparent medium to the pasting member by electrostatic adsorption.

According to another aspect of the present invention, there is provided an image forming apparatus including an image forming device that forms an image on a surface of a transparent medium; and a pasting device including a pasting member operative to paste a non-transparent medium onto the surface of a transparent medium; and a conveying member that conveys the non-transparent medium to the pasting member by electrostatic adsorption.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
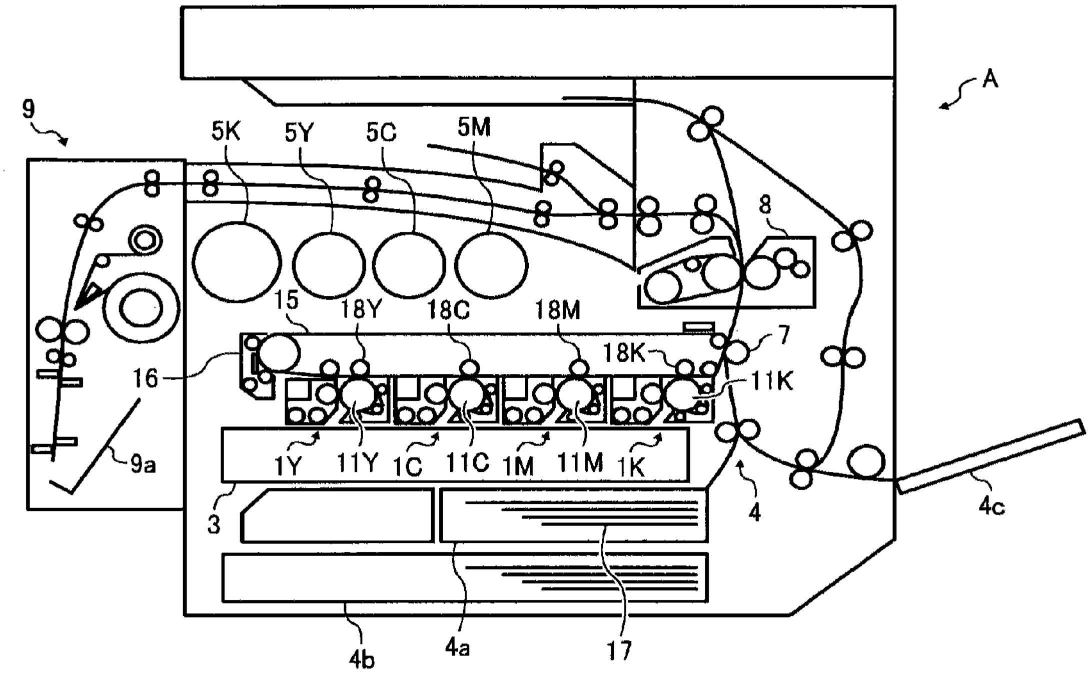
FIG. 1 is a schematic diagram of an image forming apparatus according to an embodiment of the present invention.
Figure 2:
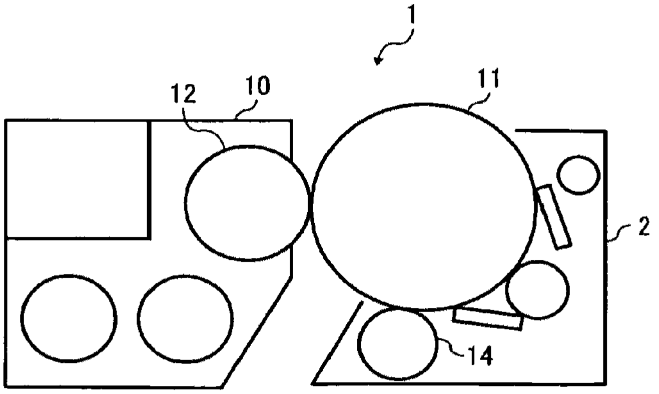
FIG. 2 is a schematic diagram of an image forming unit shown in FIG. 1.

Exemplary embodiments of the present invention are explained in detail with reference to the drawings. FIG. 1 is a schematic diagram of an image forming apparatus according to an embodiment of the present invention. FIG. 2 is a schematic diagram of an image forming unit shown in FIG. 1.

This image forming apparatus includes an image forming apparatus body A that forms toner images on a recording medium, and a pasting apparatus 9 attached to the image forming apparatus body A. The pasting apparatus 9 performs a post-processing on the recording medium discharged from the image forming apparatus.

As shown in FIG. 1, the image forming apparatus body A includes four image forming units 1Y, 1C, 1M, and 1K that form images of each of the colors of yellow (Y), cyan (C), magenta (M) and black (K). The order of the colors of Y, C, M, and K is not limited to that of FIG. 1. The structure of an arbitrary image forming unit 1 from among the image forming units 1Y, 1C, 1M, and 1K is explained with reference to FIG. 2.

The image forming units 1Y, 1C, 1M, and 1K include photosensitive drums 11Y, 11C, 11M, and 11K, that are image carriers, a charging unit, a developing unit, and a cleaning unit. The image forming units 1Y, 1C, 1M, and 1K are arranged such that the rotating axes of the photosensitive drums 11Y, 11C, 11M, and 11K are parallel. Each of the image forming units 1Y, 1C, 1M, and 1K are also located at a predetermined pitch in a direction of movement of a transfer paper.

As shown in FIG. 2, the image forming unit 1, which can be any one of the image forming units 1Y, 1C, 1M, and 1K includes a photosensitive unit 2 and a developing unit 10. The photosensitive unit 2 includes a charging roller 14 that is a charging unit and a photosensitive drum 11. The developing unit 10 includes a developing roller 12.

As shown in FIG. 1, an optical writing unit 3 including a light source, a polygon mirror, an f-θ lens, and a reflecting mirror etc. is arranged below the image forming units 1Y, 1C, 1M, and 1K. This optical writing unit 3 irradiates laser light onto the surfaces of each of the photosensitive drums 11Y, 11C, 11M, and 11K while scanning, based on image data.

A primary transfer unit 6 having a transferring and conveying belt 15 that performs conveying in such a manner that toner images formed by each of the image forming units 1Y, 1C, 1M, and 1K are overlaid and transferred is arranged above the image forming units 1Y, 1C, 1M, and 1K as a belt drive apparatus. A cleaning apparatus 16 including a brush roller, or a cleaning blade, is arranged so as to come into contact with the outer surface of the transferring and conveying belt 15. Foreign matter such as toner that becomes attached to the transferring and conveying belt 15 is removed by the cleaning apparatus 16.

A secondary transfer unit 7 that transfers toner images to a transfer paper 17 is arranged at the right side of the primary transfer unit 6. A fixing unit 8, which can be of a belt fixing type, is arranged above the secondary transfer unit 7. Paper feed cassettes 4*a*, 4*b* that house the transfer paper 17 are provided at a lower part of the image forming apparatus body A. A manual paper feed tray 4*c* for feeding paper manually from the side is provided at a side surface of the image forming apparatus body A.

In addition, toner replenishment containers 5Y, 5C, 5M, and 5K, and primary transfer rollers 18Y, 18C, 18M, and 18K are shown in FIG. 1, and a used-toner bottle and power supply unit etc. that are not shown in the drawings are also provided.

Developing unit for each of the colors Y, C, M, or K have the same or similar structure as the developing unit 10 shown in FIG. 2. The developing unit 10 adopts a two-component developing method where just the colors of the toners used are different and houses a developer including a toner and a magnetic carrier.

The photographic image quality and the texture of the images can be improved by using fine grain polymerizing toner.

The developing unit 10 includes the developing roller 12 that faces the photosensitive drum 11, a screw for feeding and agitating the developer, and a toner concentration sensor etc. The developing roller 12 also includes a freely rotating sleeve on the outside and a magnet fixed on the inside (not shown). Toner is then replenished by a toner replenishing apparatus according to the output of the toner concentration sensor.

First, a predetermined voltage is applied by a power supply (not shown) to the charging roller 14 because of which the surface of the opposing photosensitive drum 11 is charged. The surface of the photosensitive drum 11 charged to a predetermined potential is scanned successively by laser light based on image data from the optical writing unit 3 and electrostatic latent images are written.

When the surface of the photosensitive drum 11 that carries the electrostatic latent image reaches the developing unit 10, toner is supplied to the electrostatic latent image on the surface of the photosensitive drum 11 by the developing roller 12 arranged opposite the photosensitive drum 11 whereby a toner image is formed of the surface of the photosensitive drum 11.

The above operation is then carried out in the same manner at a predetermined timing for all of the photosensitive units 2Y, 2C, 2M, 2K of the image forming units 1Y, 1C, 1M, and 1K and toner images of predetermined colors are formed on the surfaces of the photosensitive drums 11Y, 11C, 11M, and 11K.

The transfer paper 17 is conveyed from any of either the paper feed cassettes 4*a*, 4*b*, or the manual paper feed tray 4*c* and is temporarily stopped upon reaching a registration roller 4. Toner images on each of the photosensitive drums 11Y, 11C, 11M, and 11K are sequentially transferred onto the transferring and conveying belt 15 when the photosensitive units 2Y, 2C, 2M, 2K form images.

This transfer of the toner images is carried out by applying a voltage that is of a reverse polarity of the polarity of the toner at the photosensitive drums 11Y, 11C, 11M, and 11K from the primary transfer rollers 18Y, 18C, 18M, and 18K arranged opposite each of the photosensitive drums 11Y, 11C, 11M, and 11K sandwiching the transferring and conveying belt 15 using the power supply.

With the arrangement in FIG. 1, a final position facing the photosensitive drum 11K is passed through and a toner image that is toner images for four colors overlaid is transferred onto the transfer paper 17, sent by the registration roller 4, by the secondary transfer unit 7. The transfer paper 17 is conveyed to the fixing unit 8 and it is subjected to heat and pressure whereby the toner image is fixed onto the transfer paper 17.

If the transfer paper 17 is transparent, in its entirety or in a part, a mirror image is formed on the transfer paper 17. For the sake of explanation, it is assumed here that the transfer paper 17 has a transparent portion at least one portion. The transfer paper 17 is then conveyed to the pasting apparatus 9 after passing through the fixing unit 8.

The present invention relates to technology where, a mirror image is formed at the image forming apparatus body A on a recording medium that is a transfer paper that is transparent portion at least one portion, and a medium that is non-transparent, or that is white, with an adhesive layer, which can be transparent or white, is then attached at the pasting apparatus 9 to the image-formed surface of the recording medium to prepare an image-printed medium.

Figure 3:
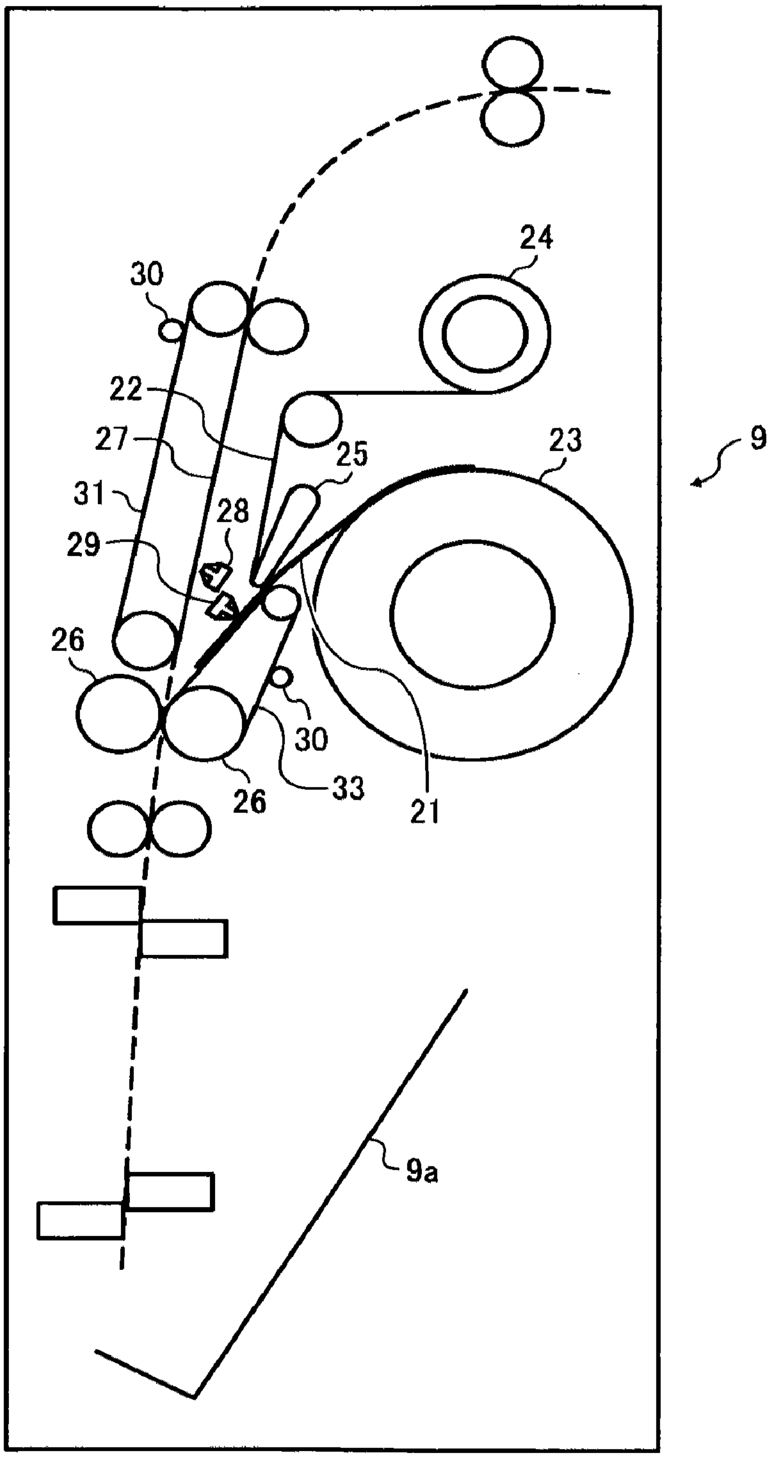
FIG. 3 is a schematic diagram of a pasting apparatus shown in FIG. 1.

FIG. 3 is a schematic diagram showing the main parts of the pasting apparatus 9. At the pasting apparatus 9, a pasting prevention mechanism that prevents pasting is arranged upstream from the position of pasting the two mediums during a series of processes for pasting the two mediums together. As a result, both mediums are not pasted until a predetermined joining position is reached. Joining together of the mediums at an unintended time is therefore prevented. A loading unit 9*a* is shown at the lowermost part of the pasting apparatus 9 of FIG. 3.

As shown in FIG. 3, a non-transparent medium 21 with peeling paper 22 affixed to an adhesive layer is wrapped around a non-transparent medium roll 23. When the non-transparent medium 21 is fed to the conveying path side (pasting position=attachment position) of a transparent recording medium 27 from the non-transparent medium roll 23, the peeling paper 22 is separated from the non-transparent medium 21 by a separating plate 25 and is wrapped around a peeling paper wrapping roller 24. The non-transparent medium 21 and the peeling paper 22 are wrapped around the non-transparent medium roll 23 cut to a predetermined size according to the size of the recording medium.

At this time, the non-transparent medium 21 is peeled from the peeling paper 22 while being separated while curved by the separating plate 25. Sensors 28, 29 are provided to the front of pressure rollers 26 to detect the transparent recording medium 27 and the non-transparent medium 21.

The pasting apparatus 9 can finely adjust the positions of the tips of the transparent recording medium 27 and the non-transparent medium 21 so as to line up the positions using a control signal from a control unit based on signals from the sensors 28, 29. By providing the sensors 28, 29, it is possible to detect the position and length of the transparent recording medium 27 and the non-transparent medium 21 and use the positions to trigger the driving of electrostatic adsorption belts 31, 32.

The sensors 28, 29 are provided at opposing surfaces at of conveying paths (upstream side of the attaching position) of the two mediums 27, 21. It is therefore possible to detect the positions of the respective mediums before attaching the two mediums 27, 21. The timing can then be finely adjusted and the ends of the two mediums 27, 21 can be lined up.

The transparent recording medium 27 is stuck to the first electrostatic adsorption belt 31 charged by an adsorption bias roller 30 and is conveyed up to a position of pasting with the non-transparent medium 21. The non-transparent recording medium 21 is stuck to the second electrostatic adsorption belt 32 charged by the adsorption bias roller 30 and is conveyed up to a position of pasting with the transparent recording medium 27.

The non-transparent medium 21 and the transparent recording medium 27 are then led towards the nip of the pressure rollers 26. The electrostatic adsorption member that is the pasting prevention mechanism is the belt 32. Conveying of the non-transparent white medium is therefore smooth and stable medium attaching can be achieved.

In this case, a structure is adopted where one of the pressure rollers 26 is used as a drive roller for the second electrostatic adsorption belt 32, with the second electrostatic adsorption belt 32 being hung across the pressure rollers 26. The first and second electrostatic adsorption belts 31, 32 can be controlled so as to be rotated by a unit such as a stepping motor taking a signal from the sensors 28, 29 as a trigger.

Further, a control unit that drives the electrostatic adsorption belt 32 is provided. Stable medium attachment can therefore be implemented without unnecessary operations by controlling the driving of the electrostatic adsorption belt 32.

In the embodiment in FIG. 3, the transparent recording medium 27 is also stuck using the first electrostatic adsorption belt 31 and conveyed but it is also possible to stick only the non-transparent medium 21 using the second electrostatic adsorption belt 32 for conveying.

Figure 4:
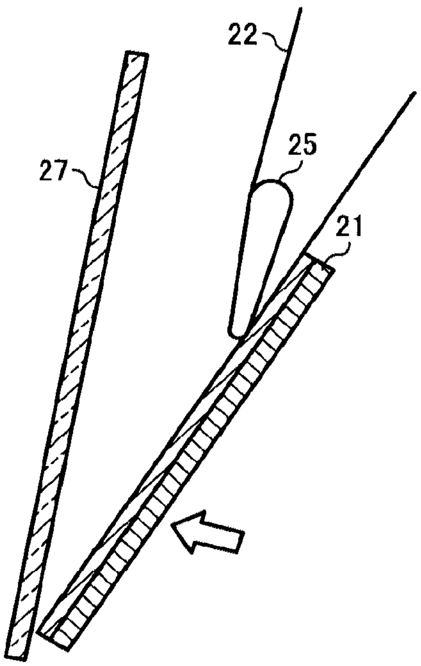
FIG. 4 is an enlarged diagram of a first state upstream from the pressure rollers that paste the transparent recording medium and the non-transparent medium.
Figure 5:
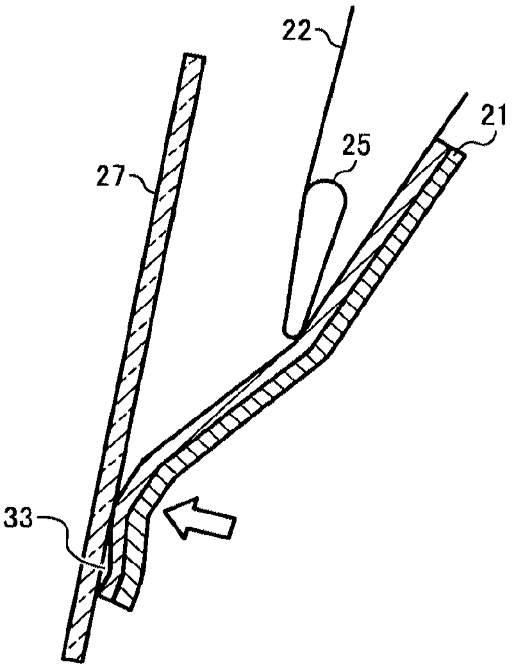
FIG. 5 is an enlarged diagram of a second state upstream from the pressure rollers.
Figure 6:
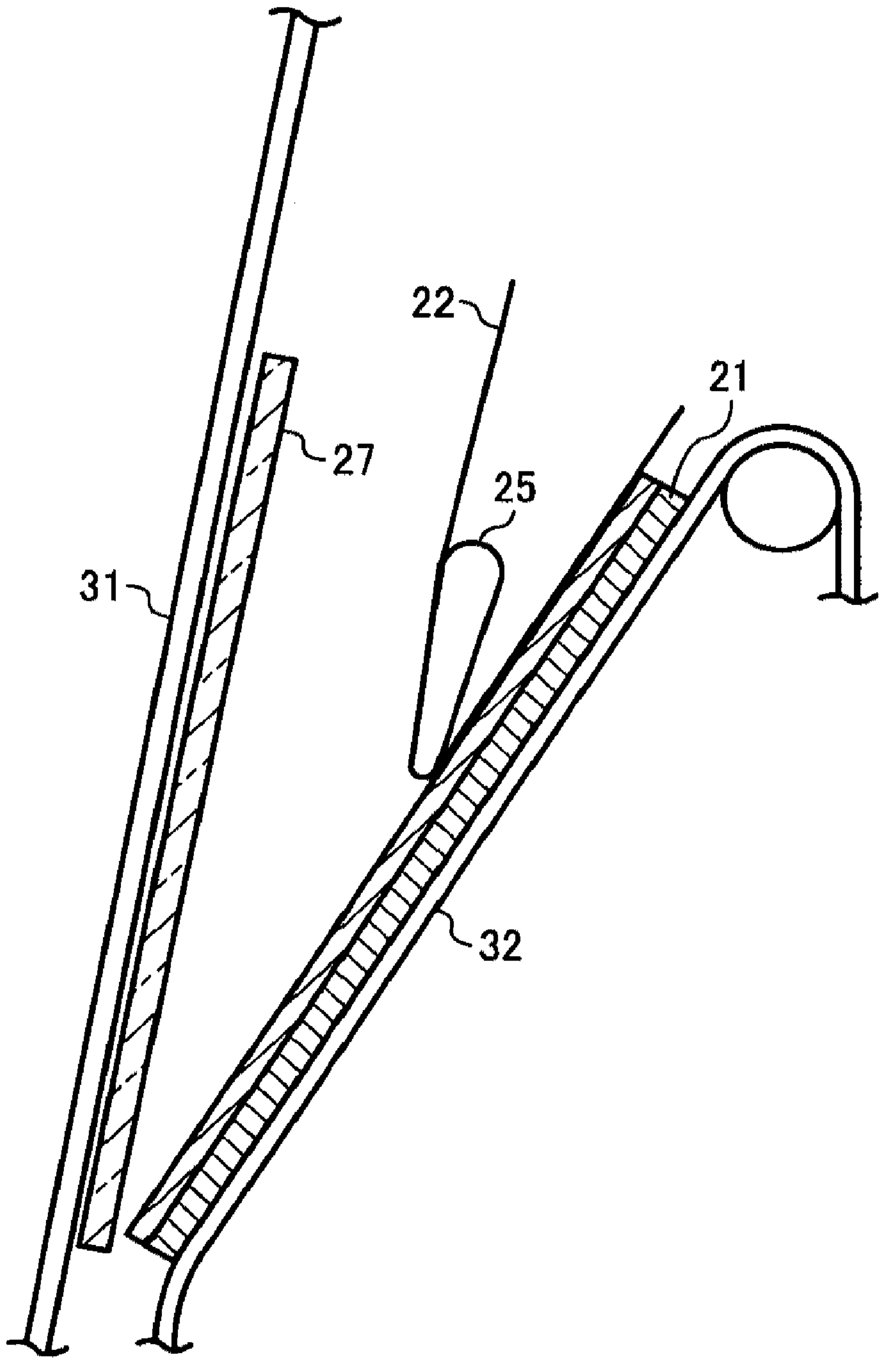
FIG. 6 is an enlarged diagram of the first state together with the electrostatic adsorption belt.

FIG. 4 is an enlarged diagram of a first state upstream from the pressure rollers 26 when pasting the transparent recording medium and the non-transparent medium. FIG. 5 is an enlarged diagram of a second state upstream from the pressure rollers 26 when pasting the transparent recording medium and the non-transparent medium. FIG. 6 is an enlarged diagram of the first state when pasting the transparent recording medium and the non-transparent medium together with the electrostatic absorption belt.

An explanation is given with reference to FIG. 4, FIG. 5, and FIG. 6, of a state for actually sticking a transparent recording medium and a non-transparent medium. A free end of the non-transparent medium 21 separated by the separating plate 25 is in a free, unrestricted state as shown by the arrow of FIG. 4.

As shown in FIG. 5, the free end of the non-transparent medium 21 is therefore pasted to the transparent recording medium 27 in a state that is not intended. Wrinkles and air bubbles 33 therefore occur at the portion where the transparent recording medium 27 and the non-transparent medium 21 are pasted at this time. Contact between the two mediums 21, 27 at undesirable positions can be avoided using the electrostatic adsorption belts 31, 32 that are the pasting prevention mechanism of the present invention shown in FIG. 6.

Figure 7:
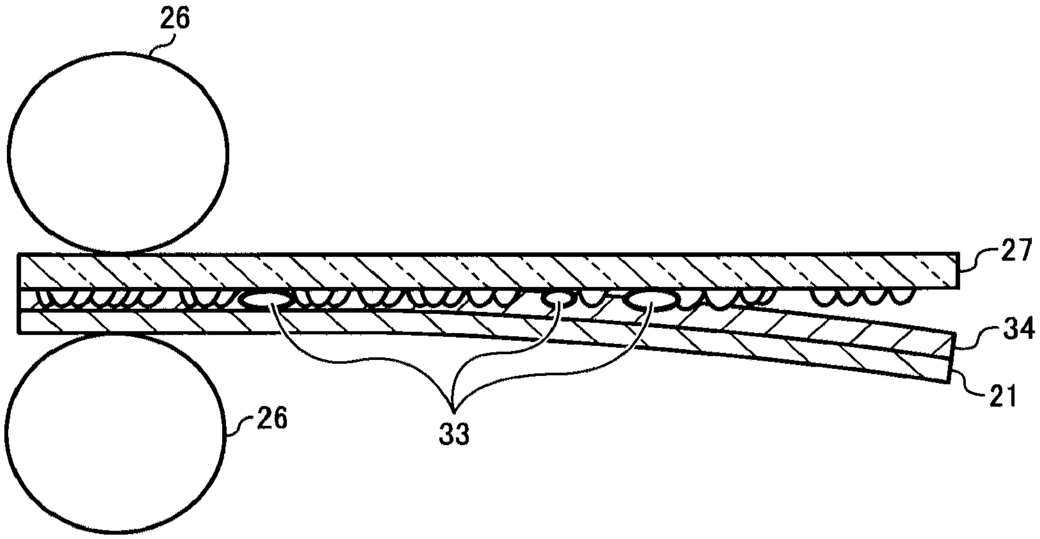
FIG. 7 is a schematic diagram of explaining the situation where air bubbles occur when the transparent recording medium and the non-transparent medium that are in a free state enter the nip of the pressure rollers and are pasted together.
Figure 8:
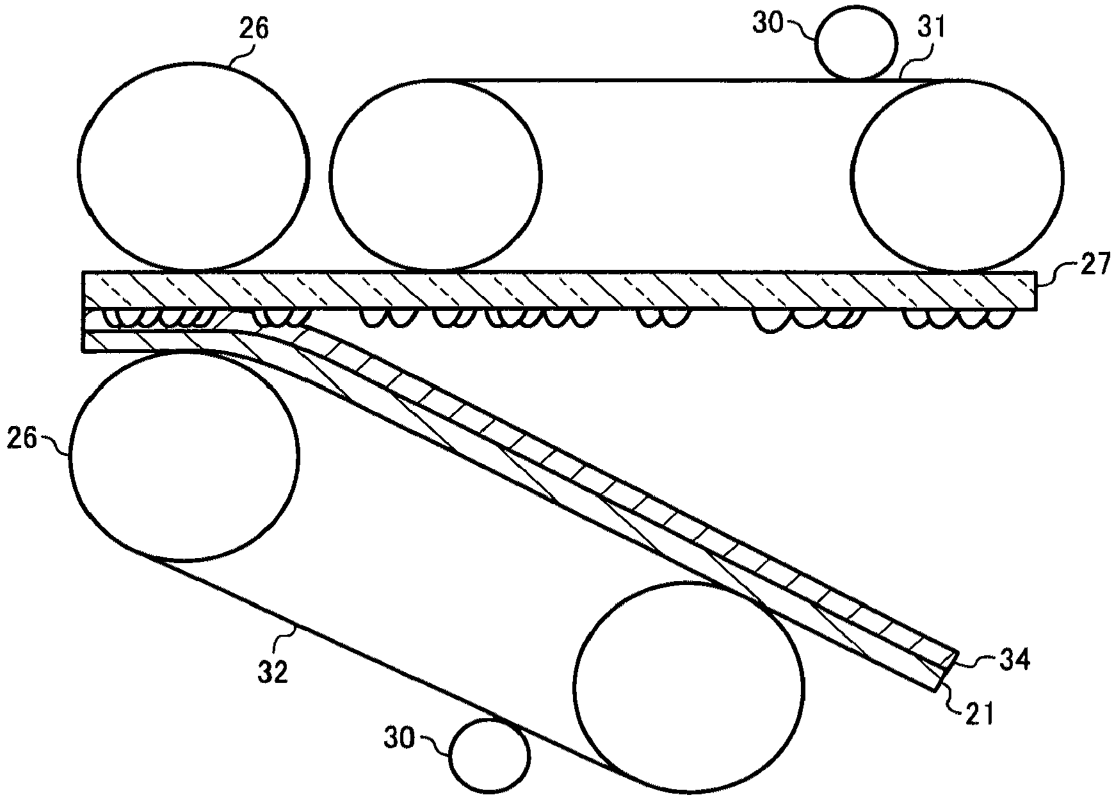
FIG. 8 is a schematic diagram for explaining the state when the transparent recording medium and the non-transparent medium enter the nip of the pressure rollers with the pasting prevention mechanism interposed therebetween.

FIG. 7 is a schematic diagram of the situation where air bubbles occur when the transparent recording medium 27 and the non-transparent medium 21 that are in a free state enter the nip of the pressure rollers and are pasted together. FIG. 8 is a schematic diagram showing the state when the transparent recording medium 27 and the non-transparent medium 21 enter the nip of the pressure rollers 26 via the pasting prevention mechanism interposed therebetween.

Air bubbles 33 occur as the result of incorrect attachment when the transparent recording medium 27 and the non-transparent medium 21 are pasted using adhesive 34 in a free state and are sent to the nip of the pressure rollers 26. On the contrary, in the present embodiment, as shown in FIG. 8, the transparent recording medium 27 and the non-transparent medium 21 are guided by the pasting prevention mechanism. Namely, the transparent recording medium 27 and the non-transparent medium 21 are conveyed attached to the belt surfaces of the first and second electrostatic adsorption belts 31, 32 charged by the adsorption bias roller 30 acting as a pasting prevention mechanism.

It is therefore possible to paste the two mediums 27, 21 at a time appropriate for pasting without erroneous attachment occurring in the operation for the first and second electrostatic adsorption belts 31, 32. Air bubbles are therefore prevented from occurring in between the two mediums 27, 21 and uniformity of white parts without toner images can be maintained.

Figure 9:
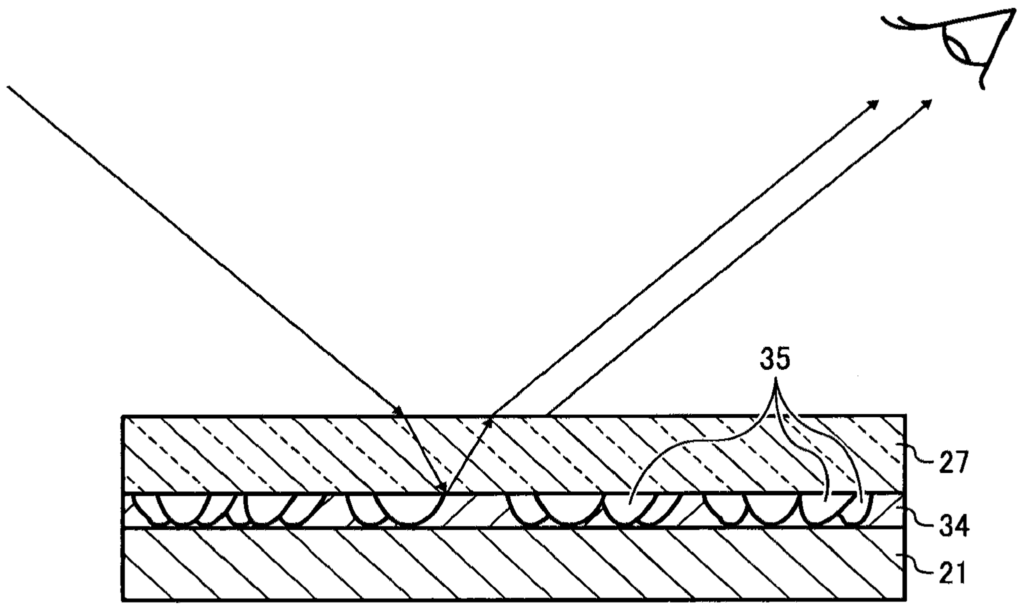
FIG. 9 is a schematic diagram outlining refraction of light when there are no air bubbles between the two pasted mediums.
Figure 10:
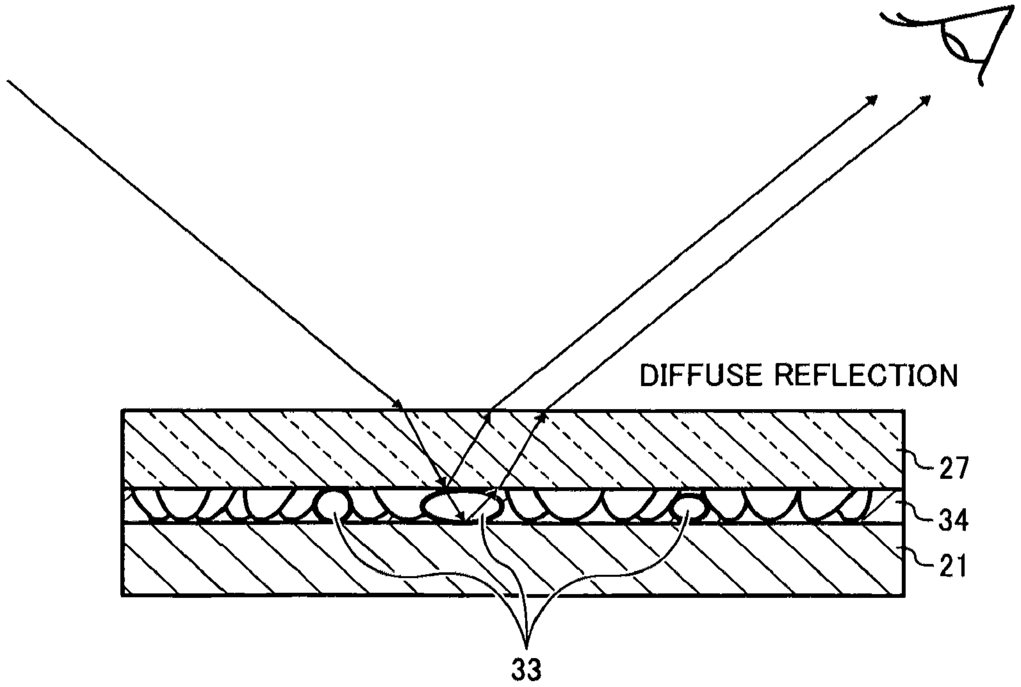
FIG. 10 is a schematic diagram outlining refraction of light when there are air bubbles between the two pasted mediums.

FIG. 9 is a schematic diagram outlining refraction of light when there are no air bubbles between the two pasted mediums. FIG. 10 is a schematic diagram outlining refraction of light when there are air bubbles between the two pasted mediums.

When the transparent recording medium 27 and the non-transparent medium 21 are pasted using adhesive 34, when there are no air bubbles, there is no diffused reflection caused by the refraction of light. An image (toner image) 35 is maintained that is uniform and has no white sections (FIG. 9).

However, as shown in FIG. 10, when air bubbles (a layer of air) 33 are present between the transparent recording medium 27 and the non-transparent medium 21 as a result of erroneous attachment, light from the transparent recording medium 27 is diffracted within the air bubbles 33. This diffracted light therefore appears to be reflected in a scattered manner and is detrimental to the uniformity of white portions.

Figure 11A:
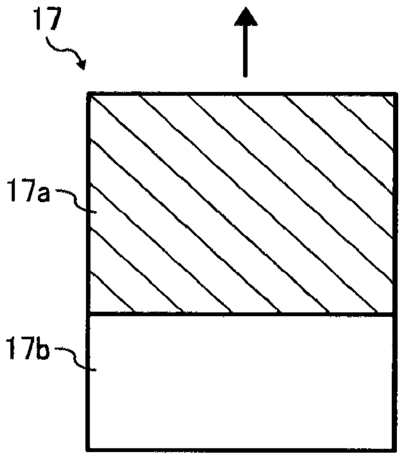
FIGS. 11A to 11D depict several examples of transparent recording mediums.
Figure 11B:
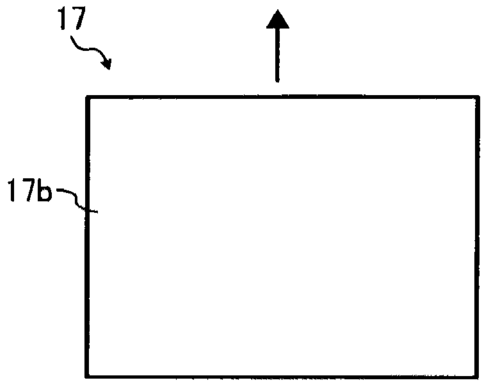

FIGS. 11A to 11D depict various examples of transparent recording mediums. As shown in FIG. 11A, the transfer paper 17 may have a non-transparent portion 17*a* at a front edge and a transparent portion 17*b* at a rear edge in relation to the feed direction of the transfer paper 17. Alternatively, as shown in FIG. 11B, the whole of the transfer paper 17 may have the transparent portion 17*b*.

Figure 11C:
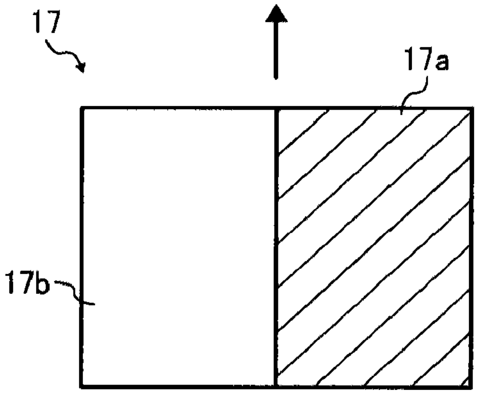
Figure 11D:
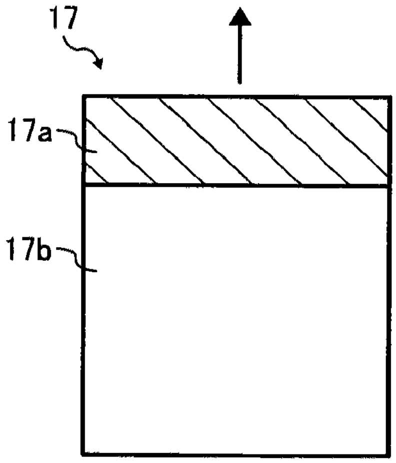

Alternatively, as shown in FIGS. 11C and 11D, the left side half of the transfer paper 17 may have the transparent portion 17*b* and the right side half may have the non-transparent portion 17*a*. Alternatively, just the tip can be the non-transparent portion 17*a* with a remaining large portion being the transparent portion 17*b*. Namely, at least one portion of the transfer paper 17 can be transparent. In other words, a portion of the transfer paper 17 can be non-transparent.

Figure 12A:
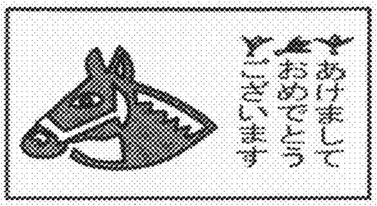
FIGS. 12A to 12D are schematic diagrams for explaining an outline of the process for formation of an image-printed medium according to the embodiment.
Figure 12B:
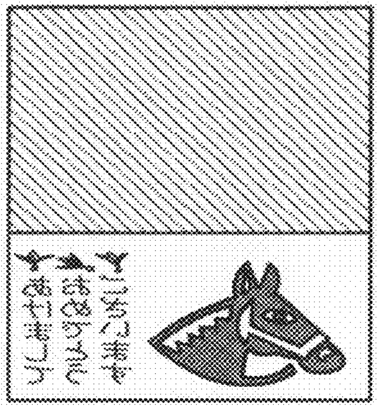

FIGS. 12A to 12D are schematic diagrams for explaining an outline of the process for formation of an image-printed medium according to the embodiment. An original image is shown in FIG. 12A. As shown in FIG. 12B, a mirror image of the original image is formed at the transparent portion 17*b* of the transfer paper 17. The transfer paper 17 shown in FIG. 12B has the transparent portion 17*b* as shown in FIG. 11A.

Figure 12C:
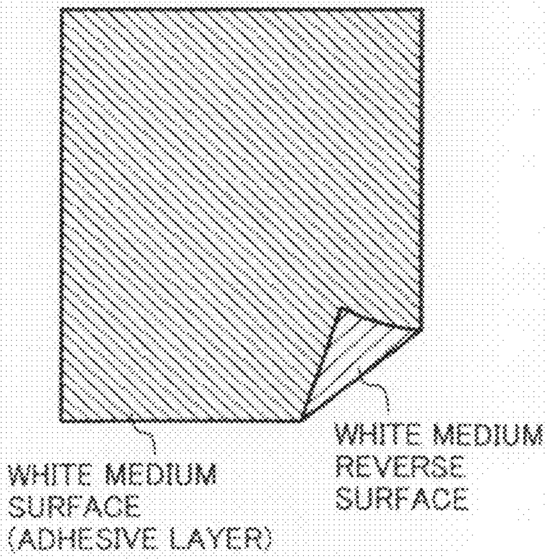
Figure 12D:
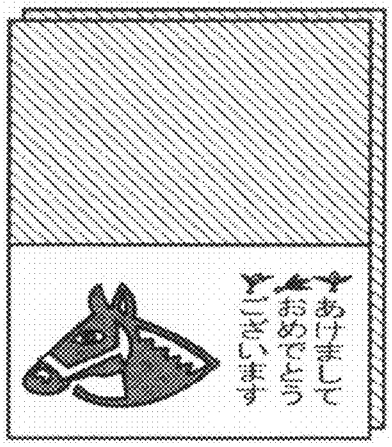

A white medium having an adhesive layer on one side is shown in FIG. 12C. The transfer paper 17 shown in FIG. 21B is then stuck to the white medium shown in FIG. 12C thereby preparing an image-printed medium shown in FIG. 12D. It is therefore possible to obtain a photographic quality image.

According to an aspect of the present invention, photographic quality images can be obtained by overlaying and pasting a non-transparent medium formed with an adhesive layer on an image-formed surface of a recording medium formed with a mirror image at a transparent portion.

An electrostatic adsorption member is used in conveying of at least a non-transparent body in a structure for pasting apparatus that affix a, for example, white non-transparent medium to a recording medium having a transparent portion. It is therefore possible to prevent the mediums becoming adhered together at an unintended time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pasting apparatus, comprising:

a pasting member operative to paste a non-transparent medium onto an image-formed surface of a transparent medium;

a conveying member that conveys the non-transparent medium to the pasting member by electrostatic adsorption; and a first detecting unit and a second detecting unit that detect presence of the non-transparent medium and the transparent medium, respectively, upstream from the pasting member, wherein the first and second detecting units detect a position and length of the respective non-transparent medium and transparent medium, and use the positions to trigger driving of electrostatic adsorption members.

2. The pasting apparatus according to claim 1, wherein the conveying member includes an endless belt.

3. The pasting apparatus according to claim 1, further comprising a control unit that controls driving of the conveying member.

4. The pasting apparatus according to claim 1, wherein the image formed on the image-formed surface of the transparent medium is a mirror image.

5. The pasting apparatus according to claim 1, wherein the transparent medium includes a non-transparent portion.

6. The pasting apparatus according to claim 1, further comprising another conveying member that conveys the transparent medium to the pasting member by electrostatic adsorption.

7. An image forming apparatus, comprising:

an image forming device that forms an image on a surface of a transparent medium; and a pasting device including:

a pasting member operative to paste a non-transparent medium onto the surface of a transparent medium;

a conveying member that conveys the non-transparent medium to the pasting member by electrostatic adsorption; and a first detecting unit and a second detecting unit that detect presence of the non-transparent medium and the transparent medium, respectively, upstream from the pasting member, wherein the first and second detecting units detect a position and length of the respective non-transparent medium and transparent medium, and use the positions to trigger driving of electrostatic adsorption members.

8. The image forming apparatus according to claim 7, wherein the image forming device forms an image on the transparent medium using fine grain polymerizing toner.

9. The image forming apparatus according to claim 7, wherein the conveying member includes an endless belt.

10. The image forming apparatus according to claim 7, wherein the pasting device further includes a control unit that controls driving of the conveying member.

11. The image forming apparatus according to claim 7, wherein the image formed on the image-formed surface of the transparent medium is a mirror image.

12. The image forming apparatus according to claim 7, wherein the transparent medium includes a non-transparent portion.

13. The image forming apparatus according to claim 7, wherein the pasting device includes another conveying member that conveys the transparent medium to the pasting member by electrostatic adsorption.

14. The pasting apparatus according to claim 1, wherein the first and second detecting units are provided at opposing surfaces at conveying paths of the respective non-transparent medium and transparent medium.

15. The image forming apparatus according to claim 7, wherein the first and second detecting units are provided at opposing surfaces at conveying paths of the respective non-transparent medium and transparent medium.

16. The pasting apparatus according to claim 1, wherein the electrostatic adsorption member that is a pasting prevention mechanism is a belt.

17. The image forming apparatus according to claim 7, wherein the electrostatic adsorption member that is a pasting prevention mechanism is a belt.

18. The pasting apparatus according to claim 1, wherein the transparent medium is stuck to a first electrostatic adsorption belt charged by a first adsorption bias roller and is conveyed up to a position of pasting with the non-transparent medium; and the non-transparent medium is stuck to a second electrostatic adsorption belt charged by a second adsorption bias roller and is conveyed up to a position of pasting with the transparent medium.

19. The image forming apparatus according to claim 7, wherein the transparent medium is stuck to a first electrostatic adsorption belt charged by a first adsorption bias roller and is conveyed up to a position of pasting with the non-transparent medium; and the non-transparent medium is stuck to a second electrostatic adsorption belt charged by a second adsorption bias roller and is conveyed up to a position of pasting with the transparent medium.

* * * * *